(12) United States Patent
Graf et al.

(10) Patent No.: US 9,369,375 B2
(45) Date of Patent: Jun. 14, 2016

(54) LINK-LAYER LEVEL LINK AGGREGATION AUTOCONFIGURATION

(71) Applicant: Red Hat, Inc., Raleigh, NC (US)

(72) Inventors: Thomas Graf, Fehraltorf (CH); Jiri Pirko, Chocen (CZ)

(73) Assignee: Red Hat, Inc., Raleigh, NC (US)

( * ) Notice: Subject to any disclaimer, the term of this patent is extended or adjusted under 35 U.S.C. 154(b) by 35 days.

(21) Appl. No.: 14/102,205

(22) Filed: Dec. 10, 2013

(65) Prior Publication Data

US 2015/0163100 A1  Jun. 11, 2015

(51) Int. Cl.
*H04L 12/709* (2013.01)
*H04L 12/24* (2006.01)
*H04L 12/751* (2013.01)
*H04L 12/26* (2006.01)

(52) U.S. Cl.
CPC .......... *H04L 45/245* (2013.01); *H04L 41/0886* (2013.01); *H04L 41/12* (2013.01); *H04L 43/12* (2013.01); *H04L 45/02* (2013.01); *Y02B 60/43* (2013.01)

(58) Field of Classification Search
None
See application file for complete search history.

(56) References Cited

U.S. PATENT DOCUMENTS

| | | | |
|---|---|---|---|
| 6,393,483 B1 | 5/2002 | Latif et al. | |
| 6,397,260 B1 | 5/2002 | Wils et al. | |
| 6,535,489 B1* | 3/2003 | Merchant et al. | 370/244 |
| 6,819,680 B2 | 11/2004 | Hickman et al. | |
| 6,910,149 B2 | 6/2005 | Perloff et al. | |
| 7,616,653 B1* | 11/2009 | Droux et al. | 370/420 |
| 7,783,784 B1* | 8/2010 | Droux et al. | 709/250 |
| 7,881,230 B2* | 2/2011 | Vinayagam et al. | 370/255 |
| 8,213,296 B2 | 7/2012 | Shannon et al. | |
| 9,042,234 B1* | 5/2015 | Liljenstolpe et al. | 370/238 |
| 2001/0030962 A1* | 10/2001 | Song et al. | 370/389 |
| 2011/0085562 A1* | 4/2011 | Bao et al. | 370/401 |
| 2011/0194562 A1* | 8/2011 | Simmons et al. | 370/395.31 |
| 2013/0148547 A1* | 6/2013 | Page et al. | 370/255 |

FOREIGN PATENT DOCUMENTS

CN 101651960 A 2/2010

OTHER PUBLICATIONS

Kyriakos et al., "Network and Domain Autoconfiguration: A Unified Approach for Large Dynamic Networks," University of Maryland; Telcordia Technologies, Aug. 2005, http://www.hynet.umd.edu/~baras/publications/papers/2005/ManousakisBMM_2005.pdf.
Chen, Kai et al., "Generic and Automatic Address Configuration for Data Center Networks", SIGCOMM, Aug. 30- Sep. 3, 2010, pp. 39-50, New Delhi, India.
Touch, J. et al., "Transparent Interconnection of Lots of Links (TRILL): Problem and Applicability Statement", IETF Network Working Group, Request for Comments 5556, May 2009, 17 pages.

* cited by examiner

*Primary Examiner* — Gary Mui
(74) *Attorney, Agent, or Firm* — Lowensteni Sandler LLP

(57) ABSTRACT

A computing device identifies a plurality of network interface controllers (NICs) that are available for link aggregation. The computing device probes a network using a plurality of protocols to detect a topology of at least one network to which the plurality of NICs are connected. The computing device automatically establishes a link aggregation configuration including one or more of the plurality of NICs based on the determined network topology.

20 Claims, 6 Drawing Sheets

LINK-LAYER LEVEL LINK AGGREGATION AUTOCONFIGURATION

TECHNICAL FIELD

Embodiments of the present invention relate to link aggregation, and more specifically to automatically discovering network topology and performing link aggregation based on the network topology.

BACKGROUND

The bandwidth used by a compute node in a data center typically exceeds the capabilities of a single network interface controller (NIC). Accordingly, link aggregation technologies are used to bundle network bandwidth and provide redundancy. In conventional systems, when a system administrator wants to set up link-layer level link aggregation, the system administrator uses his knowledge of the network topology to manually configure the link aggregation. This is often problematic because the administrator may lack knowledge as to the network topology and/or may not know how to set up the link aggregation.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for automatically determining a network topology and configuring a link-layer link aggregation based on the determined network topology. Link aggregation is the generation of a single logical channel from the bundling of multiple physical ports. Link aggregation is performed to provide redundancy for network interface controllers (NICs), to provide bandwidth that is greater than a single NIC can provide, to perform load balancing, and for other reasons. However, link aggregation typically will not be performed successfully without first knowing which NICs to aggregate and the network topology of the network to which the NICs are connected. Accordingly, the configuration of link-layer level link aggregation is typically manually performed by a network administrator with knowledge about the network topology and the computing device for which link aggregation is to be set up.

Embodiments simplify the process of setting up link-layer level link aggregation configurations, and in some instances completely eliminate manual input by an administrator. Moreover, embodiments enable link-layer level link aggregation to be set up even in instances in which an administrator is not familiar with the network topology or the computing device to be connected to the network. Embodiments also provide an application programming interface (API) that other applications such as orchestration systems (e.g., Openstack) may use to automatically establish link-layer level link aggregation configurations.

In one embodiment, processing logic identifies multiple network interface controllers (NICs) of a computing device that are available for link aggregation. The processing logic then probes a network using multiple different protocols to detect a topology of a network to which the NICs are connected. The processing logic then automatically establishes a link aggregation configuration including one or more of the NICs based on the determined network topology.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some embodiments are described herein with reference to physical switches. However, it should be appreciated that the principles introduced and described with reference to physical switches also apply to virtual network switches. Accordingly, embodiments of the present invention are not limited to physical switches, and those embodiments describing physical switches may be modified for use with virtual network switches.

Figure 1:
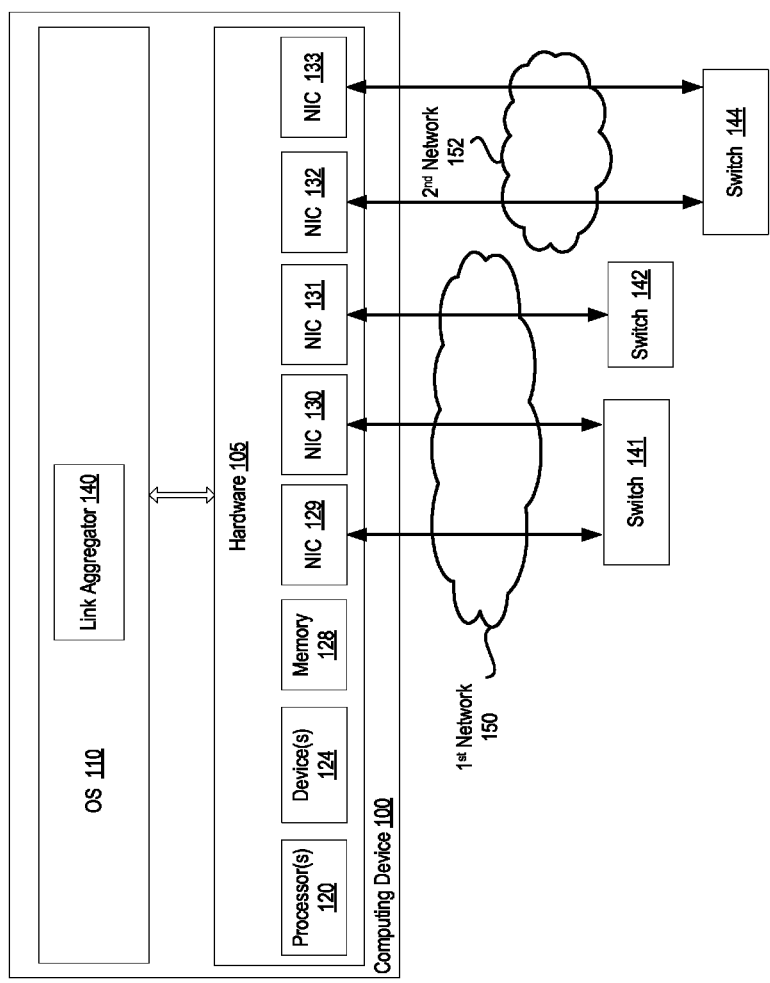
FIG. 1 is a block diagram that illustrates an example network architecture in which link layer level links may be configured, in accordance with one embodiment of the present application.

FIG. 1 is a block diagram that illustrates an embodiment of a computing device 100. The computing device 100 may be a rackmount server, a workstation, a desktop computer, a notebook computer, a tablet computer, a mobile phone, a compute node of a data center, etc. The computing device 100 includes hardware 105, which may include one or more processors 120, one or more devices 124, memory 128, multiple physical network interface controllers (NICs) 129-133, and other hardware components. The memory 128 may include volatile memory devices (e.g., random access memory (RAM)), non-volatile memory devices (e.g., flash memory), and/or other types of memory devices. The hardware 105 may also be coupled to external storage (not shown) via a direct connection or a local network. The computing device 100 may be a single machine or multiple machines arranged in a cluster.

Each of the devices 124 may be a physical device that is internal or external to the computing device 100. Examples of internal devices include a graphics card, hardware RAID controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive, external I/O devices, etc.

NICs 129-133 provide a hardware interface between the computing device 100 and a network. NICs may support wired standards, wireless standards, or both. The NICs 129-133 may be Ethernet controllers, Wi-Fi controllers, Token Rings, Infiniband controllers, and so forth. The NICs 129-133 provide functionality to communicate over a network using specific physical layer (OSI layer 1) and data link layer (OSI layer 2) standards (e.g., Ethernet, Wi-Fi, Token Ring, etc.). Each NIC 129-133 includes a unique media access control (MAC) address, which may be stored in a read only memory of the NIC 129-133.

The computing device 100 includes an operating system (OS) 110. The computing device may additionally include a server (e.g., a web server), a database and/or database management system (DBMS), a hypervisor and/or virtual machines, or other functionality. The computing device 100 may be configured to manage many connections to other devices over a network. Accordingly, the computing device may consume large amounts of bandwidth, and may accordingly have multiple NICs 129-133 to handle the large bandwidth usage.

In order to optimally use the multiple NICs 129-133, the computing device 100 may configure one or more link-layer level link aggregations from some or all of these NICs 129-133. In one embodiment, computing device 100 includes a link aggregator 140 that automatically sets up link-layer level link aggregation configurations.

Link aggregator 140 probes the NICs 129-133 and the remote endpoints to which the NICs are attached to detect a network topology of one or more networks to which the NICs 129-133 are connected. Link aggregator 140 uses multiple different protocols to probe the NICs and the networks. For example, link aggregator 140 may use at least two of link aggregation control protocol (LACP), address resolution protocol (ARP), link line discovery protocol (LLDP), internet protocol version six neighbor discovery protocol (IPv6 NDP), or dynamic host configuration protocol (DHCP) to send out probes. Other types of probes may also be used.

In the illustrated example, link aggregator 140 probes the NICs 129-133 to determine speeds or bandwidth capabilities of each of the NICs. Ethernet NICs typically support speeds of 10 Megabits per second (Mbits/s), 100 Mbits/s or 1000 Mbits/s. Wi-Fi NICs typically support speeds of between 54 Mbits/s and 866 Mbits/s.

Link aggregator 140 may also probe the NICs 129-133 and the endpoints (e.g., switches 141-144) to which the NICs are connected to determine which NICs are on the same network. In one embodiment, Link aggregator 140 broadcasts or multicasts a message out from one or more of the NICs 129-133 and then listens for that broadcast message from the other NICs. Such a broadcast message will be sent to each endpoint on a network that receives the broadcast. Accordingly, if a broadcast is sent out on a NIC, it can be determined that each other NIC at which that broadcast message is received is connected to the same network segment. For example, if link aggregator 140 broadcasts a message from NIC 129, that message would be received at NIC 130 and NIC 131, but would not be received at NIC 132 and NIC 133. Accordingly, link aggregator 140 could determine that NICs 129-131 are connected to first network 150. Similarly, link aggregator 140 could determine that NICs 132-133 are connected to second network 152.

Link aggregator 140 may additionally probe the switches 141-144 to which the NICs 129-133 are connected to determine which NICs are connected to the same switches. For example, link aggregator 140 may determine that NIC 129 and 130 are connected to the same switch 141, and that NIC 132 and NIC 133 are connected to the same switch 144. Link aggregator 140 may additionally probe the switches to determine capabilities of the switches, such as to determine whether the switches support LACP. Link aggregator 140 may also probe the switches 141-144 to determine additional information, such as whether there are any virtual local area networks (VLANs) that are used by any of the switches.

Once link aggregator 140 has obtained enough information to determine the network topologies for the first network 150 and the second network 152, link aggregator 140 may apply one or more link aggregation rules to aggregate the NICs 129-133. For example, link aggregator 140 might generate a first link-layer level link aggregation using NICs 129-131 and may generate a second link-layer level link aggregation using NICs 132-133 in one embodiment. Alternatively, link aggregator 140 may generate the first link-layer level link aggregation using just NIC 129 and NIC 130. NIC 131 may be omitted from the first link aggregation, for example, if NIC 131 is a 100 Mbit/s NIC and NICS 129-130 are 1000 Mbit/s NICS and/or if switch 141 supports LACP. The link aggregator 140 is described in greater detail below with reference to FIG. 2.

Figure 2:
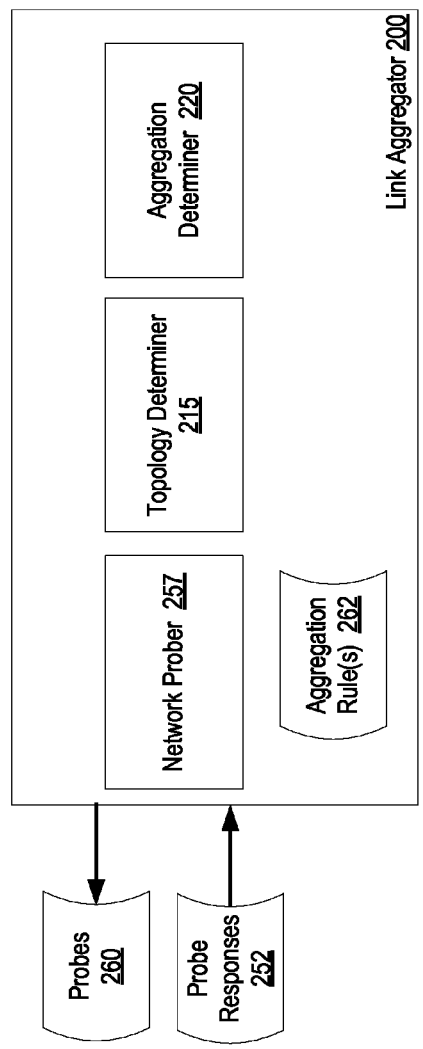
FIG. 2 is a block diagram of a link aggregator, in accordance with one embodiment of the present invention.

FIG. 2 is a block diagram of a link aggregator 200, in accordance with one embodiment of present invention. In one implementation, link aggregator 200 corresponds to link aggregator 140 of FIG. 1. Link aggregator 200 is configured to probe a network to determine a network topology and create link-layer level link aggregation configurations based on the network topology.

In one embodiment, the link aggregator 200 includes a network prober 257, a topology determiner 215 and an aggregation determiner 220. The link aggregator 200 may also include one or more aggregation rules 262 that may be used to set up link aggregation configurations.

Network prober 257 sends out multiple different types of probes 260 to endpoints that NICs of a computing device are connected to and/or to the NICs themselves. Multiple different protocols may be used to send out multiple different types of probes 260. Each of the different types of probes 260 may be used to gather a different type of information. Ultimately, the network prober 257 should send out enough different probes 260 to gather information about the network that can be used to determine a topology of the network. Such information may include information about nodes (e.g., switches, servers, computer systems, etc.) on the network, properties of those nodes, and so on. Some information is received in the form of probe responses 252, which may be forwards of the original probes, responses generated by nodes based on the probes, and so on. Network prober 257 may also receive some messages from other nodes without first sending out probes. For example, for some protocols such as LLDP nodes send out periodic messages. A non-exhaustive list of protocols that may be used to send out probes includes link aggregation control protocol (LACP), address resolution protocol (ARP), link line discovery protocol (LLDP), internet protocol version six neighbor discovery protocol (IPv6 NDP), or dynamic host configuration protocol (DHCP).

ARP probe messages, DHCP probe messages, IPv6 NDP probe messages, or other types of probe messages may be used to determine which NICs are on the same network segment. Any of these protocols may be used to broadcast a probe message from a NIC. Network prober 257 may then listen in on the other NICs to determine if they have received the broadcast probe message. If a NIC receives the broadcast probe, then that NIC is on a network segment that is connected to a network segment of the NIC from which the probe was broadcast. If a NIC fails to receive the broadcast probe, then that NIC is on a network segment that is not connected with the network segment of the NIC from which the probe was broadcast. No link aggregation can be performed for NICs that are on unconnected network segments.

ARP probe messages, DHCP probe messages, and/or IPv6 NDP probe messages may additionally be used to determine resident links between the NICs and switches or other nodes. The resident links may indicate how to reach a specific node on the network. If there are multiple resident links connected to a node, then there may be multiple different ways to connect to that node.

ARP is a telecommunications request and reply protocol for resolution of network layer addresses into link layer addresses. ARP probes are packets encapsulated by the line protocol and are communicated within the boundaries of a single network. The types of information that can be determined from ARP nodes is limited, but all switches should be able to forward ARP probes. Additionally, switches that have IP addresses may respond to ARP probes.

In some network environments, a switch may be prepopulated with all possible flows and/or a network may be configured such that all switches are prepopulated with all possible flows. In such instances, some protocols used for network discovery may be deactivated on the switches for security purposes. For example, firewalls and switches may be configured so as to no longer pass through ARP packets. In such an environment, protocols other than ARP would be used to determine which NICs are on the same network and/or the resident links for those NICs.

DHCP is a standardized networking protocol used on internet protocol (IP) networks that dynamically configures IP address and other information. DHCP allows devices on a network to receive IP addresses from a DHCP server, eliminating or reducing a need for a network administrator to configure these settings manually. The DHCP protocol includes a DHCP discovery mechanism in which a DHCP probe is broadcast on a physical subnet to discover available DHCP servers. Such DHCP probes may be used to discover similar information that the ARP protocol discovers. However, DHCP probes will typically be permitted to pass through switches even when ARP probes are blocked.

IPv6 NDP is a protocol that includes a set of messages or probes that may be used to determine relationships between neighboring nodes. IPv6 NDP may be used to obtain the same type of information as ARP, but for nodes that use IPv6. Some example IPv6 NDP probes include a neighbor solicitation (NS) probe, a neighbor advertisement (NA) probe, a router solicitation (RS) probe and a router advertisement (RA) probe.

LLDP is a standard link layer protocol used by networking devices to advertise their identity, capabilities and neighbors on a local area network (LAN). LLDP messages or probes may be sent at a fixed interval in the form of an Ethernet frame. Each frame may include one or more destination media access control (MAC) address, a source MAC address, a port identifier (ID), a time to live value, and/or other information. LLDP probes or messages may be used to gather information such as a system name and description, a port name and description, a virtual local area network (VLAN) name, an IP management address, system capabilities (e.g., switching, routing, etc.), MAC address, link aggregation capabilities, and so forth. LLDP-MED (media endpoint discovery) is an extension to LLDP that may also be used. LLDP-MED may be used for auto-discovery of LAN policies (e.g., VLANs, layer 2 priority, differentiated services, etc.), device location discovery, and other information.

LLDP may be used to discover VLANs configured on a port or node. If a node uses a VLAN, then that node may insert information about the VLAN into an LLDP message which will be received by the NIC. If a link layer level link aggregation is to be set up for a NIC that is connected to a node that uses a VLAN, then a VLAN tag may be inserted into messages for link validation. In addition to VLAN configurations, LLDP may be used to determine, for example, link speeds of network cards, data center bridging capabilities, and so forth.

LACP is a link aggregation protocol that can be used to aggregate links that share the same switch. That is, two NICs that are both connected to the same switch that supports LACP may be configured into a link-layer level link aggregation that uses the LACP protocol. LACP aggregated links have several advantages over traditional non-LACP aggregated links. In particular, LACP aggregated links may utilize all aggregated NICs for both uplinks and downlinks. However, non-LACP aggregated links typically use all NICs for uplinks but only a single NIC for the downlink.

Topology determiner 215 determines a topology of the network based on the probe responses 252 and/or other messages that are received from nodes on the network. In the case that the computing device on which link aggregator 200 runs is connected to multiple networks, topology determiner 215 will determine the topology of each of the networks. For example, if the computing device is connected to a data network and a management network, then topology determiner may discover the network topology of both the data network and the management network. Examples of information that may be determined about the network topology include identification of switches that each of the NICs of the computing device are connected to, a determination of which NICs are connected to the same switches, a determination of link speed for the switches and/or NICs, capabilities of the switches (e.g., whether they support LACP), whether switches use VLANs, and so forth.

Aggregation determiner 220 establishes one or more link-layer level link aggregation configurations based on the determined network topology. A separate link aggregation may be set up for each separate network that the computing device is connected to. For example, a first link aggregation may be set up for a data network and a second link aggregation may be set up for a management network.

In one embodiment, aggregation determiner 220 applies one or more aggregation rules 262 to set up the link aggregation configurations. Aggregation rules may be used to assign weights or preferences to specific individual NICs or combinations of NICs. For example, a first link aggregation rule 262 may assign weights to NICs based on their link speeds, where higher speed NICs are assigned a higher weighting than lower speed NICs. A second aggregation rule may assign a higher weighting to NICs that are connected to the same switch than to NICs that are connected to different switches. This is because typically higher performance gains can be realized for aggregations of links that are to the same switch. A third aggregation rule may assign a higher weighting to NICs that are connected to switches that support LACP than to NICs that are connected to switches that do not support LACP. Other aggregation rules may also be used. The aggregation rules may be used in combination to determine an optimal link aggregation configuration for a given network topology.

Multiple different types of link aggregation configurations are possible. For example, a first type of link aggregation configuration may combine multiple links in parallel to increase throughput above what a single NIC can sustain. A second type of link aggregation configuration may combine links in such a way that one or more secondary links provide redundancy in case a primary link fails. A third type of link aggregation performs load balancing between NICs. Other types of link configurations are also possible. An aggregated link may have a single logical address that is shared by multiple NICs or a single physical address that is shared by the multiple NICs.

Figure 3:
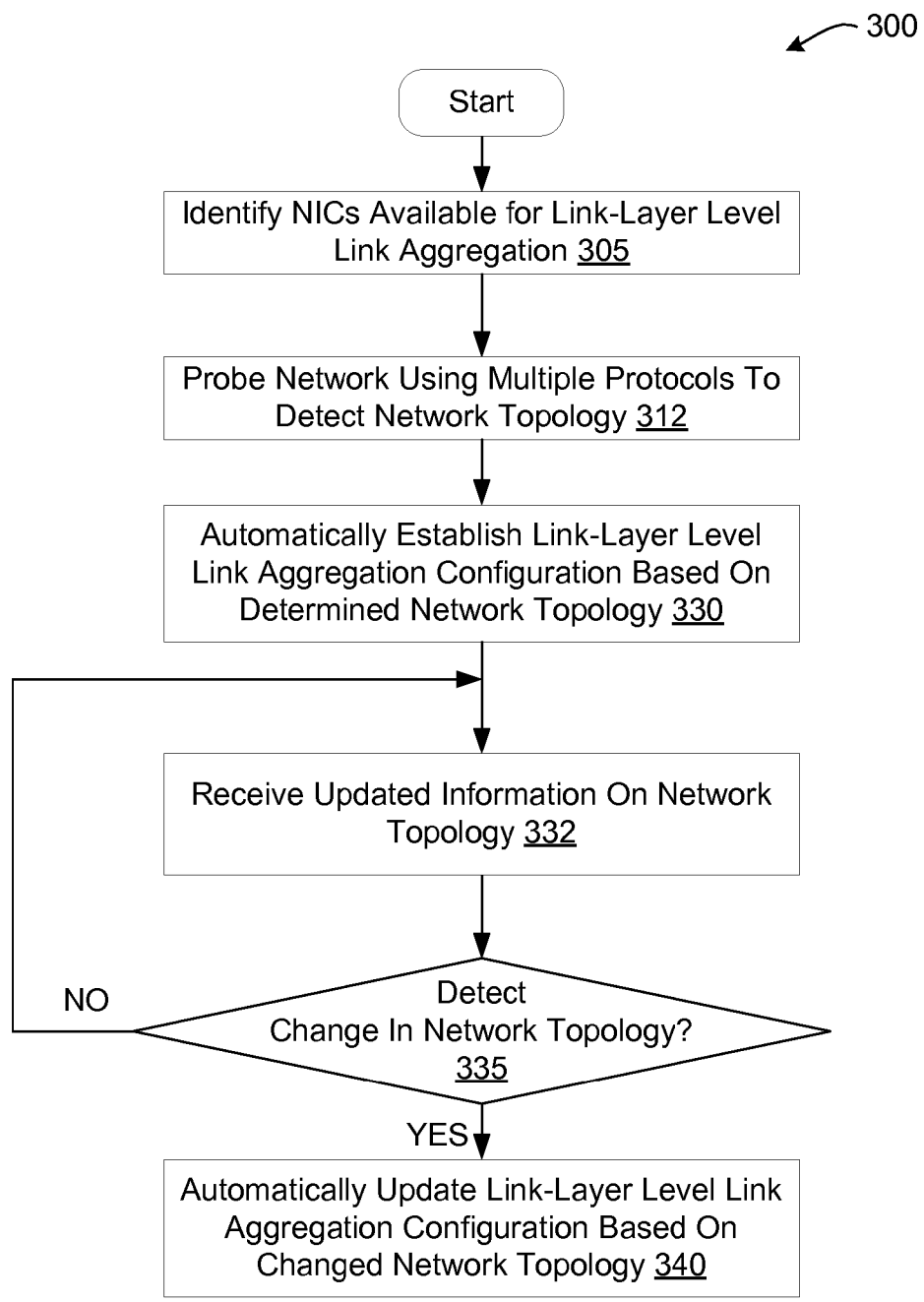
FIG. 3 is a flow diagram illustrating one embodiment for a method of establishing a link-layer level link aggregation configuration.
Figure 4:
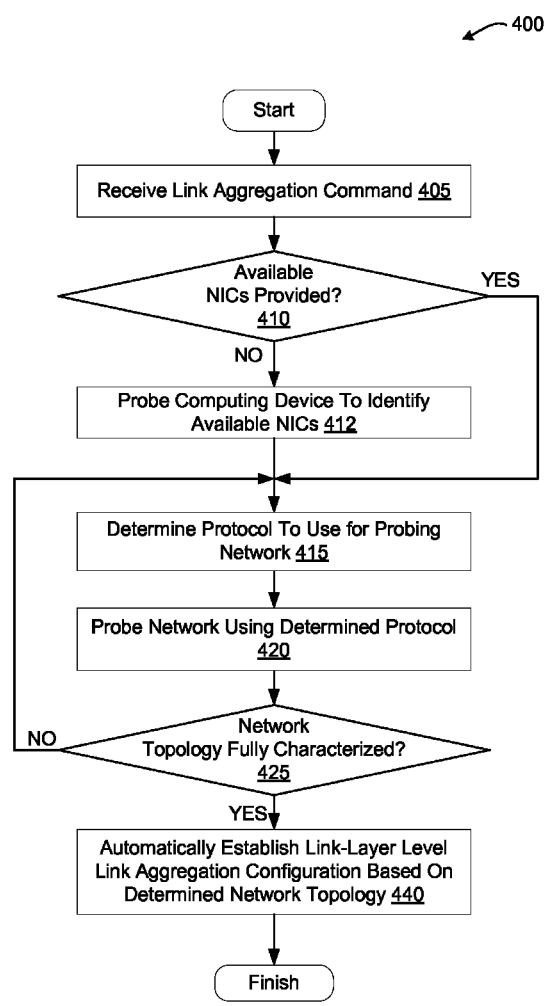
FIG. 4 is a flow diagram illustrating one embodiment for a method of determining a network topology and establishing a link-layer level link aggregation configuration.
Figure 5:
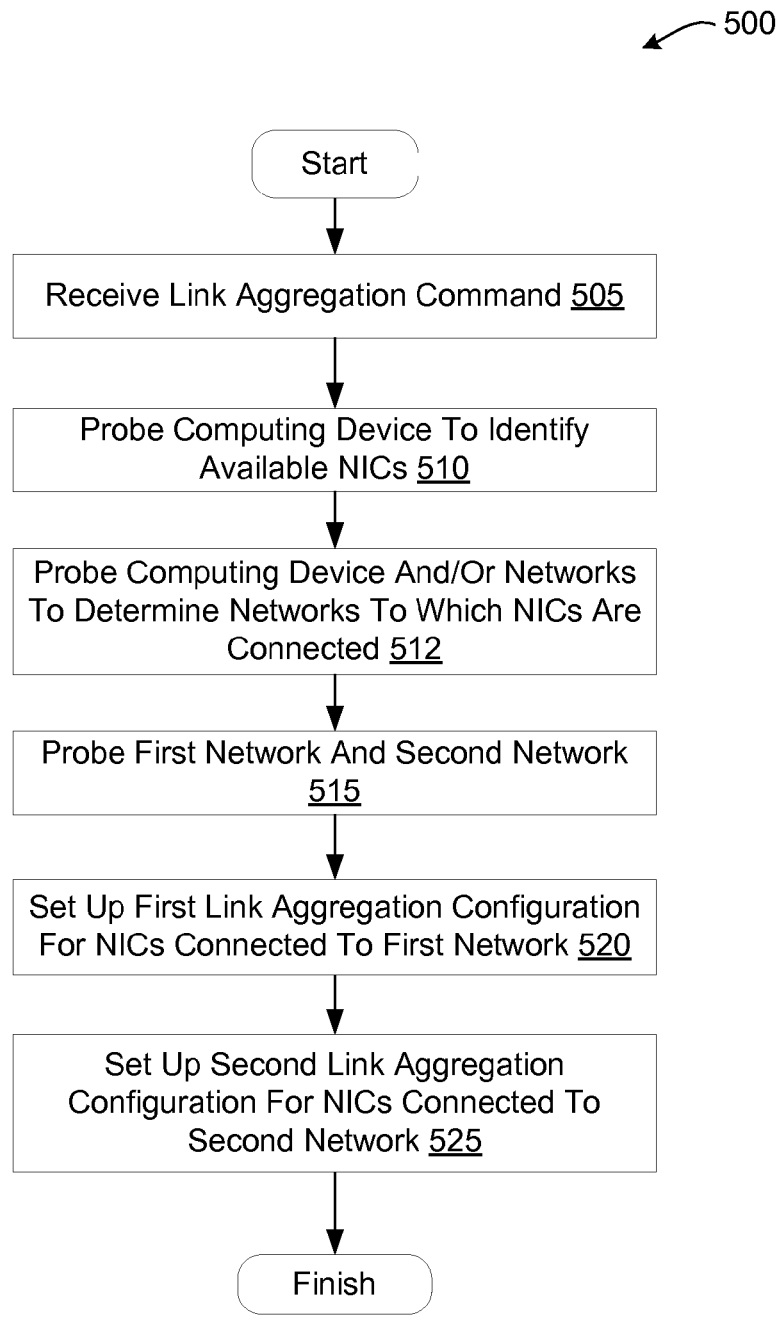
FIG. 5 is a flow diagram illustrating one embodiment for a method of establishing multiple link aggregation configurations for a computing device.

FIGS. 3-5 are flow diagrams of various embodiments of methods related to network topology discovery and automatic link aggregation configuration. The methods are performed by processing logic that may include hardware (circuitry, dedicated logic, etc.), software (such as is run on a general purpose computer system or a dedicated machine), or a combination of both. In one implementation, the methods are performed by a computing device running a link aggregator, such as link aggregator 200 of FIG. 2. The methods of FIGS. 3-5 enable link aggregation to be performed without any user interaction. Thus, the process of link aggregation is simplified since administrators may not know anything about the network topology in embodiments.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 3 is a flow diagram illustrating one embodiment for a method 300 of establishing a link-layer level link aggregation configuration. At block 305 of method 300, processing logic identifies one or more NICs that are available for link-layer level link aggregation. In one embodiment, a network administrator provides a list or grouping of available NICs. Alternatively, processing logic may use one or more probes to identify NICs that are available for link aggregation.

At block 312, processing logic probes a network to which the determined NICs are connected to detect a topology of the network. Multiple different types of probes using multiple different protocols are used to determine the network topology. At block 330, processing logic then automatically establishes a link-layer level link aggregation configuration based on the detected network topology. In one embodiment, processing logic applies one or more link aggregation rules to set up the link aggregation.

The network topology may not be static, and may thus change over time. For example, nodes may change IP addresses or MAC addresses, nodes may be turned on or turned off, nodes may be relocated on the network, network partitions may occur, and so forth. Processing logic may automatically adapt to such changes in the network topology, which may include changes in the hardware level and/or changes in the software level.

At block 332, processing logic receives updated information on the network topology. Such updated information may be received responsive to sending out new probes. Additionally, or alternatively, updated network topology information may be received periodically without sending out probes. For example, LLDP messages may periodically be sent by nodes in a network. Some network topology information may additionally be attached to data that is received through the course of standard operations (e.g., while downloading or uploading data).

At block 335, processing logic determines whether a change in the network topology has occurred. If such a change is detected, the method continues to block 340. At block 340, processing logic updates the link-layer level link aggregation based on the changed network topology. For example, four NICs may have originally been available for link aggregation, and a first and second NIC may have been aggregated. However, if the first and second NIC fail, then processing logic may set up a new link aggregation configuration using the third and fourth NICs. In some instances, the link aggregation configuration will not change even though the network topology has changed. If no change in the network topology is detected, the method returns to block 332. This process may continue indefinitely.

FIG. 4 is a flow diagram illustrating one embodiment for a method 400 of determining a network topology and establishing a link-layer level link aggregation configuration. At block 405 of method 400, processing logic receives a link aggregation command. Processing logic may provide an API that higher level management software such as an orchestration system may use to request that a network connection be set up.

Responsive to such a request, processing logic may determine whether or not link aggregation is appropriate for a computing device, and may automatically set up a link-layer level link aggregation if appropriate. Processing logic may also receive a request to set up a link aggregation configuration from an administrator, who may or may not identify NICs to consider for the link aggregation.

At block 420, processing logic determines whether a list of available NICs has been provided. If no such list is provided, the method continues to block 412 and processing logic probes the NICs of the computing device to determine which are available. Otherwise the method continues to block 415.

At block 415, processing logic determines a protocol to use for probing the network. The protocol may be determined based on the type of information that is yet to be obtained about the network and/or based on information currently known about the network (e.g., knowledge that ARP probes will not be forwarded by switches). At block 420, processing logic probes the network using the determined protocol.

At block 425, processing logic determines whether the network topology is fully characterized. If the network topology is not fully characterized, the method returns to block 415, and another type of probe to send out is identified. If the network topology is fully characterized, the method continues to block 440. At block 440, processing logic automatically establishes a link-layer level link aggregation configuration based on the determined network topology. The established link aggregation configuration may be an optimal configuration for the determined network topology. Processing logic may then report, for example, to an orchestration system or administrator that a network connection has been established.

FIG. 5 is a flow diagram illustrating one embodiment for a method 500 of establishing multiple link aggregation configurations for a computing device. At block 505 of method 500, processing logic receives a link aggregation command (e.g., from an orchestration system). The link aggregation command may be received as a command to set up a network connection to a data network and to a management network, for example.

At block 510, processing logic probes the computing device to identify available NICs. At block 512, processing logic probes the computing device to determine networks to which the NICs are connected. For example, processing logic may determine that a first set of NICs are connected to a first network (e.g., a data network) and that a second set of NICs are connected to a second network (e.g., a management network).

At block 515, processing logic probes the first network and the second network and determines both a topology of the first network and a topology of the second network. At block 520, processing logic sets up a first link aggregation configuration for one or more of the NICs connected to the first network. At block 525, processing logic sets up a second link aggregation configuration for one or more NICs connected to the second network. The method then ends.

Figure 6:
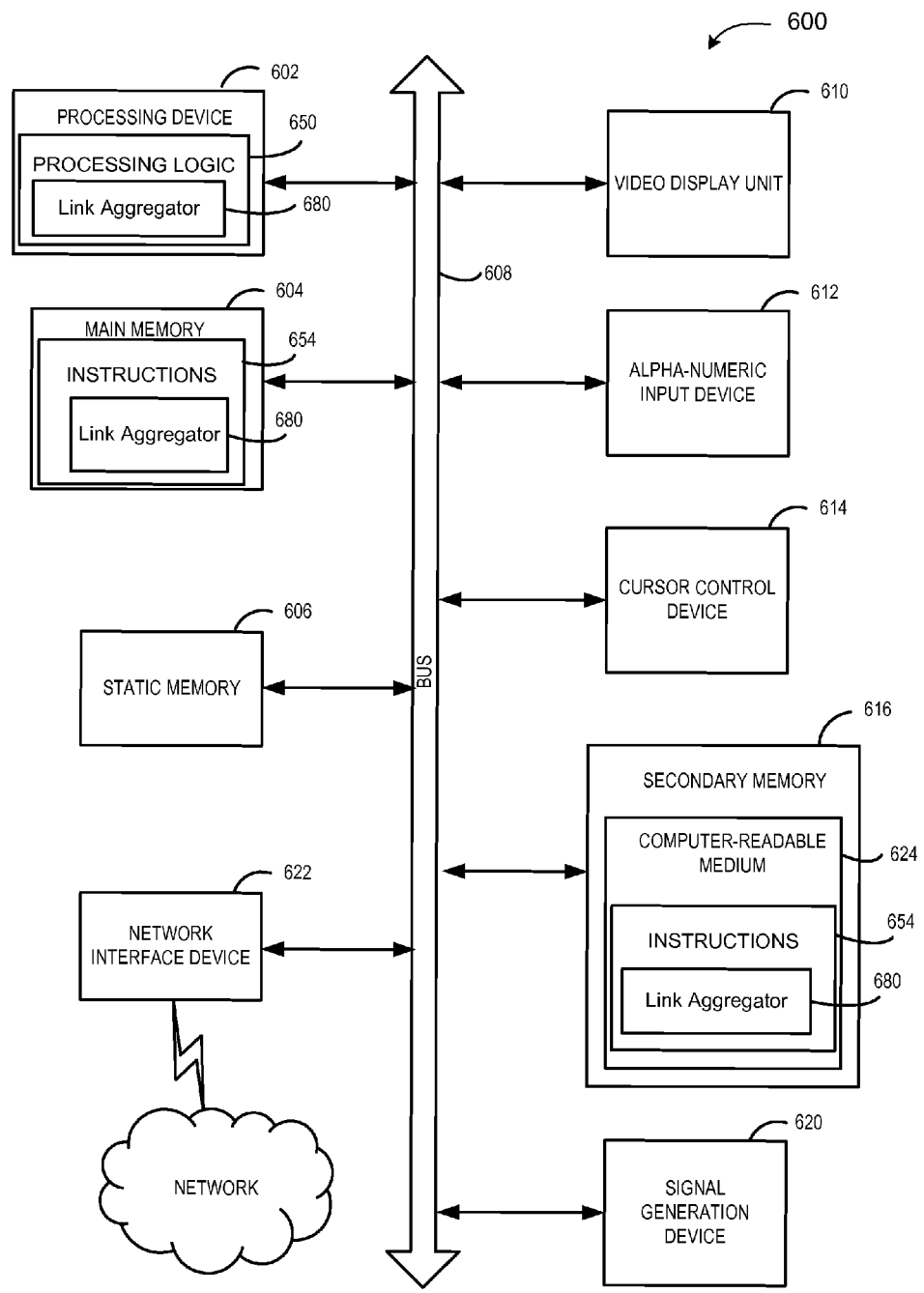
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. The computer system 600 may correspond to host machine 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computer system 600 may further include one or more network interface devices 622 (e.g., NICs). The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 654 embodying any one or more of the methodologies or functions described herein (e.g., link aggregator 680). The instructions 654 may also reside, completely or at least partially, within the main memory 604 and/or within the processing device 602 during execution thereof by the computer system 600; the main memory 604 and the processing device 602 also constituting machine-readable storage media.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein (for example in relation to FIG. 2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "probing", "establishing", "detecting", "modifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    identifying, by a processing device, a plurality of network interface controllers (NICs) of a computing device that are available for link aggregation;
    probing, by the processing device, a network using a plurality of protocols to detect a topology of at least one network to which the plurality of NICs are connected, wherein probing the network comprises:
        broadcasting or multicasting a message from a first NIC of the plurality of NICs;
        listening for the message from a remainder of the plurality of NICs; and
        receiving the message at a second NIC of the plurality of NICs;
    determining, in view of the message being received at the second NIC, that the first NIC and the second NIC can be aggregated; and
    establishing, by the processing device, a link aggregation configuration comprising one or more of the plurality of NICs in view of the determined network topology, wherein establishing the link aggregation configuration comprises aggregating the first NIC and the second NIC.

2. The method of claim 1, wherein identifying the plurality of NICs that are available for link aggregation comprises at least one of probing the computing device to identify the plurality of NICs or receiving a list of the plurality of NICs.

3. The method of claim 1, further comprising:
    detecting a change in the topology of the at least one network; and
    modifying the link aggregation configuration in view of the change in the topology.

4. The method of claim 1, wherein detecting the topology of the at least one network comprises:
    identifying, for each NIC, a switch to which the NIC is connected;
    determining, for each switch, capabilities of the switch; and
    responsive to determining that any two NICs are connected to different switches, determining whether the different switches are connected to a same network.

5. The method of claim 4, wherein detecting the topology of the at least one network further comprises:
    determining, for each switch, whether the switch is configured with a virtual local area network (VLAN); and
    determining, for each NIC, a bandwidth of the NIC.

6. The method of claim 1, wherein the plurality of protocols comprise at least two of link aggregation control protocol (LACP), address resolution protocol (ARP), link line discovery protocol (LLDP), internet protocol version six neighbor discovery protocol (IPv6 NDP), or dynamic host configuration protocol (DHCP).

7. The method of claim 1, wherein the link aggregation configuration is an optimal configuration for the topology of the at least one network that is determined in view of application of one or more link aggregation rules.

8. The method of claim 1, wherein the at least one network comprises a first network and a second network, the method further comprising:
    receiving a command from an orchestration system to set up a connection to the first network and to the second network;
    probing the computing device to identify the plurality of NICs and determine, for each NIC of the plurality of NICs, whether the NIC is connected to the first network or the second network;
    establishing a first link aggregation configuration for one or more NICs connected to the first network; and
    establishing a second link aggregation configuration for one or more NICs connected to the second network.

9. The method of claim 1, further comprising:
    applying a plurality of link aggregation rules to assign weights to combinations of the plurality of NICs; and
    determining the link aggregation configuration in view of the weights.

10. The method of claim 9, wherein the plurality of link aggregation rules comprise a first link aggregation rule that assigns weights in view of link speed, a second link aggregation rule that assigns weights in view of shared switches between NICs, and a third link aggregation rule that assigns in view of connection to switches that support link aggregation control protocol (LACP).

11. The method of claim 1, further comprising:
    after probing the network, determining that the network topology is not fully characterized;
    determining a type of information about the network topology that has not been obtained;
    determining a type of probe that is capable of obtaining the determined type of information about the network; and
    generating a new probe corresponding to the determined type of probe.

12. A non-transitory computer readable storage medium having instructions that, when executed by a processing device, cause the processing device to:
    identify, by the processing device, a plurality of network interface controllers (NICs) of a computing device that are available for link aggregation;
    probe, by the processing device, a network using a plurality of protocols to detect a topology of at least one network to which the plurality of NICs are connected, wherein probing the network comprises:
broadcasting or multicasting a message from a first NIC of the plurality of NICs:
listening for the message from a remainder of the plurality of NICs; and
receiving the message at a second NIC of the plurality of NICs;
determine, in view of on the message being received at the second NIC, that the first NIC and the second NIC can be aggregated; and
establish, by the processing device, a link aggregation configuration comprising one or more of the plurality of NICs in view of the determined network topology, wherein establishing the link aggregation configuration comprises aggregating the first NIC and the second NIC.

13. The non-transitory computer readable storage medium of claim 12, wherein identifying the plurality of NICs that are available for link aggregation comprises at least one of probing the computing device to identify the plurality of NICs or receiving a list of the plurality of NICs.

14. The non-transitory computer readable storage medium of claim 12, wherein the processing device is further to:
detect a change in the topology of the at least one network; and
modify the link aggregation configuration in view of the change in the topology.

15. The non-transitory computer readable storage medium of claim 12, wherein to detect the topology of the at least one network the processing device is further to:
identify, for each NIC, a switch to which the NIC is connected;
determine, for each switch, capabilities of the switch; and
responsive to determining that any two NICs are connected to different switches, determine whether the different switches are connected to a same network.

16. The non-transitory computer readable storage medium of claim 15, wherein to detect the topology of the at least one network the processing device is further to:
determine, for each switch, whether the switch is configured with a virtual local area network (VLAN); and
determine, for each NIC, a bandwidth of the NIC.

17. The non-transitory computer readable storage medium of claim 12, wherein the link aggregation configuration is an optimal configuration for the topology of the at least one network that is determined in view of application of one or more link aggregation rules.

18. The non-transitory computer readable storage medium of claim 12, wherein the at least one network comprises a first network and a second network, and wherein the processing device is further to:

receive a command from an orchestration system to set up a connection to the first network and to the second network;
probe the computing device to identify the plurality of NICs and determine, for each NIC of the plurality of NICs, whether the NIC is connected to the first network or the second network;
establish a first link aggregation configuration for one or more NICs connected to the first network; and
establish a second link aggregation configuration for one or more NICs connected to the second network.

19. A computing device comprising:
a memory; and
a processing device coupled to the memory, the processing device to:
identify a plurality of network interface controllers (NICs) of a computing device that are available for link aggregation;
probe a network using a plurality of protocols to detect a topology of at least one network to which the plurality of NICs are connected, wherein to probe the network the processing device is to:
broadcast or multicast a message from a first NIC of the plurality of NICs;
listen for the message from a remainder of the plurality of NICs; and
receive the message at a second NIC of the plurality of NICs;
determine, in view of the message being received at the second NIC, that the first NIC and the second NIC can be aggregated; and
automatically establish a link aggregation configuration comprising one or more of the plurality of NICs in view of the determined network topology, wherein the first NIC and the second NIC are to be aggregated in the link aggregation configuration.

20. The computing device of claim 19, wherein the at least one network comprises a first network and a second network, the processing device further to:
receive a command from an orchestration system to set up a connection to the first network and to the second network;
probe the computing device to identify the plurality of NICs and determine, for each NIC of the plurality of NICs, whether the NIC is connected to the first network or the second network;
establish a first link aggregation configuration for one or more NICs connected to the first network; and
establish a second link aggregation configuration for one or more NICs connected to the second network.

* * * * *